United States Patent Office 3,413,144
Patented Nov. 26, 1968

3,413,144
POLYURETHANE COATED ARTICLES
Edward M. La Combe, Charleston, and Walter P. Miller, St. Albans, W. Va., assignors to Union Carbide Corporation, a corporation of New York
No Drawing. Filed Mar. 23, 1965, Ser. No. 442,171
8 Claims. (Cl. 117—155)

ABSTRACT OF THE DISCLOSURE

Paper and fabrics are coated with a urethane polymer which is the reaction product of bis(2-isocyanato)ethyl fumarate and an alkanediol having from 2 to 12 carbon atoms or a polyalkylene glycol having from 2 to 5 carbon atoms in the alkylene moiety and a molecular weight of from 106 to 8000. After cure the polymer is crosslinked. The treated paper has the same utilities of similar coated papers.

---

This invention relates to novel coated articles. More specifically, it relates to fibrous articles treated with cross-linkable polymers obtained from bis(2-isocyanato)ethyl fumarate and certain aliphatic diols and the cross-linked polymers thereof.

It has previously been found that bis(2 - isocyanato) ethyl fumarate when reacted with a limited class of aliphatic diols will produce solvent soluble unmodified polyurethane polymers which will cross-link readily in air in the absence of a catalyst. It has also been found that certain vinyl monomers can be added to the polyurethanes prior to cross-linking and that these modified polyurethanes will also readily cross-link. The cross-linkable and the cross-linked polymers have many uses, but they are of particular utility in the treatment or coating of textiles and paper.

The polyurethane polymers can be added to the paper or fibrous material in any conventional known procedure. Thus, it can be padded; applied from a solution of an organic or inorganic solvent; or from an emulsion or suspension. These procedures and the methods in which the polyurethane-containing coating or impregnating mixture is produced are obvious to one skilled in the art and such individuals will experience little or no difficulties.

Among the fibrous materials that can be treated are the paper and cardboard products made from either natural cellulosic fibers, or synthetic fibers, or mixtures. The fabrics that can be used can be in any of the conventional forms. They can be treated as a tow, filament, fiber or yarn; or as a fabric, woven, knit, scrim, etc.; or as a mat. Illustrative fibers are the natural fibers, for example, the cellulosics cotton, flax, linen, etc.; and the synthetic fibers, for example, rayon, cellulose acetate, nylon, acrylic, modacrylic, polyester, vinyl chloride, vinylidene chloride, olefin, etc.; including all synthetic fibers produced from the homopolymers, copolymers, terpolymers, etc. Also included are the blends of various natural or synthetic fibers alone or mixtures of both the natural and synthetic fibers. These fibers are so well known that they need not be discussed in detail.

The cross-linkable polyurethanes are produced by the reaction of equimolar amounts of bis(2-isocyanato)ethyl fumarate with the aliphatic diols hereinafter defined. While the polyurethanes contain equimolar amounts of each reactant, it is obvious that one can produce the same products from a reaction mixture that is not equimolar in concentration, and in fact it is advantageous to use a slight excess of the aliphatic diol. The reaction can be carried out at any temperature from about room temperature up to about the boiling point of the reaction mixture at autogeneous pressure; preferred temperatures, however, are from about 80° C. to about 110° C. The polyurethanes can be produced in an inert solvent or diluent, though this is not necessarily present, and in an inert atmosphere.

The diols suitable for producing the cross-linkable polyurethanes are known alkanediols having from 2 to about 12 or more carbon atoms, such as ethylene glycol, 1,2 - propanediol, 1,3 - propanediol, 1,4 - butanediol, 1,6 - hexanediol, 2 - ethyl - 1,3 - hexanediol, 2 - ethyl-1,6 - hexanediol, 1,8 - octanediol, 1,10 - decanediol, 2,3-dimethyl - 2,3 - butanediol, 1,12 - dodecanediol, and the like. Any alkenediol can be used which has a molecular weight from 62 up to about 450 or more; however, those having molecular weights up to about 200, as defined above, are preferred.

Further suitable diols are the known polyalkylene glycols wherein the alkyleneoxy group has from 2 to about 5 carbon atoms therein, preferably 2 or 3 carbon atoms, either in linear or branched configuration, such as polyethylene glycol, polypropylene glycol, the copolymeric poly(ethylene/propylene) glycol, and the like. The polyalkylene glycols useful are those having molecular weights from 106 up to about 8000 or more; however, those having molecular weights up to about 1000 are preferred.

In producing the cross-linkable polyurethanes a mixture of alkane diols and polyalkylene glycols can be used. Further, trihydric polyols, such as glycerol, can replace up to about 25 percent of the diols without deleterious effect.

It has been found that the alkalenediols produce solid, hard polyurethane resins which are soluble in solvents such as dimethylformamide, dimethylacetamide, acetone, and the like. The polyalkylene glycols having molecular weights below about 300 produce solid, hard polyurethane resins while those having molecular weights above that value produce liquid, viscous polyurethane resins. The polyurethanes produced from the polypropylene glycols are normally soluble in organic solvents such as acetone, dimethylformamide, dimethylacetamide, and the like; those produced from polyethylene glycols of molecular weight below about 500 are soluble in mixtures of water and organic solvents; and those produced from the higher molecular weight polyethylene glycols are water soluble. In all cases the solutions were stable to storage at room temperature.

The cross-linkable polyurethanes were generally readily cross-linked via the double bond of the fumaryl moiety in the presence of oxygen or an oxygen yielding substance such as a peroxide. The cross-linking can be carried out with or without the presence of polymerizable vinyl monomer in the mixture at temperatures from about room temperature up to about 300° C., preferably from about 90° C. to about 200° C. The use of elevated temperatures is preferred to assist in solvent removal, if this is desired.

The polyurethanes produced with the diols or glycols of molecular weights below about 2000 were readily cross-linked in the presence of air; however, those in which the starting diol or glycol used had a molecular weight above about 2000 were not readily cross-linked with oxygen or air but could be cross-linked with peroxides. The cross-linking was efficiently conducted in an air oven and while the temperature had an effect on the rate of cross-linking it had no apparent effect on the degree or extent of cross-linking achieved.

Films were readily produced by casting a solution of the unmodified polyurethane composition and then heating to cross-link. The films from the polyurethanes of the alkanediols and the low molecular weight polyalkylene glycols are hard and tough and insouble in the common solvent used in producing the film. Those films produced from the polyurethanes from the higher molecular weight polyalkylene glycols were softer and more elastic in nature and while they were insoluble in the solvents they were swollen thereby. Films can also be produced from the solvent-free polyurethane compositions in known manner and cross-linked by heating as indicated above.

The polyurethane compositions modified by the addition thereto of a polymerizable vinyl monomer were also readily cross-linked by the same procedures. The vinyl monomers were readily incorporated into the compositions and the solutions thereof are stable on storage. Upon cross-linking the vinyl monomer apparently combines chemically with the polyurethane molecule. In most instances the incorporation of the vinyl monomer improved the film toughness properties. In those cases wherein a water soluble monomer was used the films produced therefrom exhibited some solubility in water.

Replacement of a portion of the polyalkylene glycol with an alkanediol or higher polyhydric polyol in producing the polyurethanes generally resulted in cross-linked polyurethanes showing improved solvent resistance and film strength over similar polyurethanes produced solely with a polyalkylene glycol. The presence of the low molecular weight alkanediol in these cross-linkable polyurethanes also served to accelerate the rate of the cross-linking reaction of the polyalkylene glycol containing polyurethane products.

The polymerizable vinyl monomers that can be used to modify the polyurethanes are well known to the average skilled polymer scientist and include those monomers containing the 1,2-ethylenically unsaturated group $CH_2=C<$. Illustrative thereof one can mention acrylic acid, methacrylic acid, chloroacrylic acid, acrylamide, methacrylamide, methoxyethoxyethyl acrylate, sodium 2-acrylamido-2-methylpropanesulfonate, 2-acryloxyethyldimethylsulfonium methyl sulfate, acrylonitrile, methacrylonitrile, vinyl chloride, vinylidene chloride, styrene, vinyl ether ether, vinyl propyl ketone, vinyl acetate, ethyl acrylate, methyl methacrylate, vinyl methyl sulfide, vinyl methyl sulfone, dimethyl itaconate, N-vinylpyrollidone, methyl vinylpyridine, N-methyl-N-vinyl acetamide, and the like.

In the reaction of the bis(2-isocyanato)ethyl fumarate with some of the low molecular weight alkanediols or polyalkylene glycols some gel formation may occur. This can be obviated to a great extent by the inclusion in the reaction mixture of small amounts of inhibitors, such as the monomethyl ether of hydroquinone, sodium nitrite, 2,4-dinitrobenzenesulfonic acid, or any other known inhibitor. The inhibitor concentration, however, must be kept at a sufficiently low level so that it does not interfere with the subsequent cross-linking reaction and the concentration thereof will depend, as is obvious, upon the particular inhibitor used as well as the particular reactants being employed.

The following examples further serve to define the invention but are not to be construed as limiting it in any manner whatsoever.

Example 1

Approximately equimolar quantities of bis(2-isocyanato)ethyl fumarate and polyethylene glycol of 600 average molecular weight were placed in a polymerization flask and heated on a steam bath. There was obtained a white, solid polyurethane containing unsaturated double bonds in the molecule. This cross-linkable polymer was dissolved in water and a film of the solution was cast on a glass surface and dried in a forced air oven at 160° C. The film was a colorless, cross-linked polyurethane which was now insoluble in water. The aqueous solution is also used to impregnate and coat paper stock.

Example 2

A polymerization flask was purged with nitrogen and charged with 43 grams of bis(2-isocyanato)ethyl fumarate and 102 grams of polyethylene glycol of 600 average molecular weight. The flask was again purged with nitrogen, sealed, and heated for 3 hours at 95° C. There was produced 145 grams of a white, solid, cross-linkable polyurethane containing repeating bis-ethyl fumaryl units ($—CH_2CH_2OOCCH=CHCOOCH_2CH_2—$) and polyethyleneoxy units connected to each other by urethane linkages.

The cross-linkable polyurethane was dissolved in 200 grams of water and a clear, viscous, homogeneous solution was produced containing only a trace of gel particles that can be used for treating paper or fabric. This solution was stable on storage. A film was cast onto a glass plate and dried for 3 hours in a forced air oven at 100° C. and cross-linked to an insoluble product. The polyurethane is cross-linked at a faster rate in the presence of a small amount of hydrogen peroxide or benzoyl peroxide in the aqueous solution.

In a similar manner, a polyurethane was produced using bis(2-isocyanato)ethyl carbonate and the same polyethylene glycol. This polyurethane did not cross-link.

Examples 3 to 15

In a manner similar to that described in Example 2, a number of cross-linkable polyurethanes were produced from ether polyols. The solid, cross-linkable polyurethanes were then dissolved to produce stable solutions. Films cast from these solutions readily cured in air to produce

TABLE A

| Example | 3 | 4 | 5 | 6 | 7 | 8 | 9 | 10 | 11 | 12 | 13 | 14 | 15 |
|---|---|---|---|---|---|---|---|---|---|---|---|---|---|
| FDI, g | 11.5 | 6.2 | 9.0 | 43.0 | 21.5 | 1.15 | 0.19 | 9.0 | 2.7 | 0.5 | 4.3 | 12.4 | 17.0 |
| Polyol, g.: | | | | | | | | | | | | | |
| Diethylene glycol | 5.0 | | | | | | | | | | | | |
| PEG 200 | | 5.0 | | | | | | | | | | 5.0 | |
| PEG 400 | | | 15.0 | | | | | | | | | | |
| PEG 600 | | | | 102.0 | | | | | | | | 5.1 | 10.0 |
| PEG 600 | | | | | 51 | | | | | | | | |
| PEG 1000 | | | | | | 5 | | | | | | | |
| PEG 6000 | | | | | | | 5 | | | | | | |
| Dipropylene glycol | | | | | | | | 5 | | | | | |
| PPG 425 | | | | | | | | | 5 | | | | |
| PPG 2025 | | | | | | | | | | 5 | | | |
| Polyol W | | | | | | | | | | | 2.08 | 6.2 | |
| 1,4-butanediol | | | | | | | | | | | | | 3.0 |
| Yield, g | 12.8 | 10.98 | 23.2 | 145.0 | 66.7 | 6.15 | 5.19 | 13.86 | 6.75 | 5.25 | 10.73 | 23.6 | 30.0 |
| Solution, g.: | | | | | | | | | | | | | |
| Polyurethane | 12.8 | 10.98 | 23.2 | 145.0 | 66.7 | 6.15 | 5.19 | 13.86 | 6.75 | 5.25 | 10.73 | 23.6 | 30.0 |
| Acetone | *160 | *53.6 | *64.4 | | | | | 112.1 | 28.75 | 84.75 | | 28.0 | 63.5 |
| Water | | | | 192 | 200 | 37.75 | 55.1 | | | | 44.6 | 28.0 | |
| Cure: | | | | | | | | | | | | | |
| Time, Hrs | 3 | 3 | 3 | 3 | 165 | 3 | 3 | 3 | 3 | 3 | 3 | 3 | 3 |
| Temp., ° C | 100 | 110 | 110 | 100 | 25 | 110 | 110 | 110 | 110 | 110 | 100 | 100 | 110 |
| Insoluble, percent | 40 | 91 | 85 | 80 | 77 | 30 | 0 | 55 | 76 | 0 | 50 | 0 | 98 |

*Total weight of acetone plus water.
FDI—bis(2-isocyanato)ethyl fumarate.
PEG—polyethylene glycol.
PPG—polypropylene glycol.
Polyol W—bis(2-hydroxy)ethylmethylsulfonium methyl sulfate.

cross-linked insoluble polyurethane products, with the exception of the polyurethanes of Examples 9, 12, and 14; in these examples a catalyst or accelerator is necessary to effect curing. For convenience the results are tabulated in Table A, in col. 4. The insolubility of the cross-linked polyurethane was determined by extraction at the boiling point with the same solvent from which the film was cast. The solutions are useful for treating fabrics or paper.

Example 16

A polymerization vessel was purged with nitrogen and charged with 10.4 grams of bis(2-isocyanato)ethyl fumarate and 5 grams of 1,6-hexanediol. The reaction vessel was again purged with nitrogen, sealed, and heated at 95° C. for 3 hours. There was produced 15.4 grams of a hard resin, which was extracted with boiling dimethylformamide to yield 50 grams of a solution having an 11.3% by weight polymer content.

The solution was used to cast a film which was air-cured for 1.5 hours at 150° C. The cured film was hard and clear, and when extracted with boiling dimethylformamide for 30 minutes was insoluble to the extent of 67% by weight.

Examples 17 to 21

In a manner similar to that described in Example 16, a number of cross-linkable polyurethanes were produced with aliphatic diols. The cross-linkable polyurethanes were then dissolved to produce stable solutions. Films cast from these solutions were readily cured in air to produce cross-linked insoluble polyurethanes. The cross-linkable polyurethanes were hard solids which cured to hard, tough products, with the exception of the polyurethane of Example 21 which was a viscous liquid that cured to an elastic solid. For convenience, the results are tabulated below in Table B.

TABLE B

| Example | 17 | 18 | 19 | 20 | 21 |
|---|---|---|---|---|---|
| FDI, g | 16.4 | 13.8 | 11.9 | 11.9 | 0.4 |
| Polyol, g.: | | | | | |
| 1,3-propanediol | 5 | | | | |
| 1,4-butanediol | | 5 | | | |
| 1,5-pentanediol | | | 5 | | |
| Neopentyl glycol | | | | 5 | |
| Teracol 30* | | | | | 5 |
| Yield, g | 9.4 | 12.0 | 1.86 | 9.6 | 5.4 |
| Solution, g.: | | | | | |
| Polyurethane | 9.4 | 12.0 | 1.86 | 9.6 | 5.4 |
| Dimethylformamide | 75.6 | 75.0 | 29.1 | 51.4 | |
| Acetone | | | | | Yes |
| Cure: | | | | | |
| Time, hrs | 3 | 3 | 3 | 3 | 3 |
| Temp., °C | 150 | 150 | 150 | 150 | 100 |
| Insoluble, percent | 60 | 11 | 65 | 9 | 23 |

*Polytetrahydrofuran having an average molecular weight of about 3,000.

Example 22

A solid cross-linkable polyurethane was produced in a manner similar to that described in Example 2 starting with 43 grams of bis(2-isocyanator)ethyl fumarate and 102 grams of polyethylene glycol of 600 average molecular weight. This polyurethane was dissolved in water to produce a solution having a solids content of 37.1% by weight. Thirty grams of the aqueous solution and 10 grams of acrylamide were mixed to form a homogeneous solution. A film was cast and cured in an air oven at 100° C. for 3 hours. The film was tack-free, hard and strong. Upon extraction of the film with boiling water for 30 minutes it was found that 93.3% of the cross-linked polyurethane was insoluble. The polyurethane composition is more readily cross-linked when an initiator is present. The cross-linked polymer was a polyurethane having acrylamide chemically bonded thereto. The solution is also useful for treating cotton fabrics.

Examples 23 to 27

In a manner similar to that described in Example 22, a number of cross-linkable solid polyurethanes were produced. Stable solutions of these polyurethanes and a polymerizable vinyl monomer were prepared in a suitable solvent and films were cast from these solutions. The solutions are also used to treat fabrics and paper. The solid films were readily air-cured to produce cross-linked insoluble polyurethanes containing the vinyl monomer chemically copolymerized therein. For convenience the results are tabulated below in Table C.

TABLE C

| Example | 23 | 24 | 25 | 26 | 27 |
|---|---|---|---|---|---|
| FDI, g | 4.3 | 4.3 | 43.0 | 6.2 | 4.3 |
| Polyol, g.: | | | | | |
| PPG 600 | 10.1 | 10.1 | 102.0 | | 10.1 |
| PEG 200 | | | | 5.0 | |
| Yield, g | 14.4 | 14.4 | 145.0 | 5.33 | 14.4 |
| Solution, g.: | | | | | |
| Polyurethane | 1.36 | 1.36 | 11.1 | 4.10 | 1.36 |
| Acetone | | | | 23 | |
| Water | 4.89 | 3.64 | 18.9 | 23 | 11.24 |
| Comonomer, g.: | | | | | |
| Monomer X | 1.25 | | | | |
| Acrylic acid | | 1.0 | | | |
| Monomer Y | | | 5.0 | | |
| Acrylamide | | | | 4.1 | |
| Monomer Z | | | | | 2.43 |
| Cure: | | | | | |
| Time, hrs | 3 | 3 | 3 | 3 | 3 |
| Temp., °C | 100 | 100 | 100 | 100 | 100 |
| Insoluble, percent | 55 | 83 | 87 | 75 | |

Monomer X—2-acryloxyethyldimethylsulfonium methyl sulfate.
Monomer Y—2-(methoxyethoxy)ethyl acrylate.
Monomer Z—sodium 2-acrylamido-2-methylpropanesulfonate.

Example 28

(A) A cross-linkable polyurethane was produced in a manner similar to that described in Example 2 starting with equimolar amounts of bis(2-isocyanato)ethyl fumarate and polyethylene glycol of 600 average molecular weight. An aqueous solution containing 5% by weight of this polyurethane was produced and padded onto nylon taffeta fabric so that the dry add-on weight of polyurethane was 3.6%, based on the weight of the fabric. The fabric was dried and cured at 135° C. for 15 minutes and tested in accord with Standard Test method 76-1959 in the 1960 AATCC test manual. The test conditions used were 65% relative humidity and a temperature of 70° F.; a value for the logarithm of the area resistivity of about 9.000 or less on a sample 1 cm. wide and 6.2 cm. long is indicative of good antistatic protection. The treated fabric had a logarithm resistivity value of 9.004 as compared to a logarithm resistivity value of 12.045 for the untreated control fabric sample.

(B) A polyurethane having the same composition as in (A) above was mixed with an equal weight of 2-acryloxyethyldimethylsulfonium methyl sulfate and an aqueous solution containing 2% by weight of each of the above compounds was prepared and padded onto th nylon taffeta fabric to a dry add-on weight of 2.84%. The treated fabric gave a logarithm resistivity value of 8.228.

Similar antistatic results are obtained with silk, cotton, wool, linen, polyester fibers, acrylic fibers, polyamide fibers, polyolefin fibers, etc., with the above compositions.

Example 29

A 25% by weight aqueous solution of a cross-linkable polyurethane, as disclosed in Example 28A, was prepared and used to treat 60 pound St. Regis semi-bleached kraft paper. Solution pick-up was controlled so that after drying the treated paper contained 5% by weight of the polyurethane. The treated paper was cured for three hours at 105° C. and then conditioned, as was an untreated control paper, for 16 hours at 22° C. and 50% relative humidity. Wet test properties were determined after the paper specimens had been soaked for 16 hours; the results are set forth below:

|  | Treated | Control |
|---|---|---|
| Wet tensile, kg./15 mm | 1.65 | 0.18 |
| Elmendorf tear ratio | 2.4 | 0.54 |
| Rupture energy in.-lb./in.³ | 15 | 0.61 |
| Young's modulus, p.s.i | 360 | 120 |

Similar results are obtained with other types and grades of paper product.

What is claimed is:

1. A wet strength paper comprising paper and a crosslinkable polyurethane which is the reaction product of (i) bis(2-isocyanato)ethyl fumarate and (ii) a diol selected from the group consisting of (a) an alkanediol having from 2 to 12 carbon atoms and (b) a polyalkylene glycol having from 2 to 5 carbon atoms in the alkylene moiety thereof and a molecular weight from 106 to 8000.

2. A wet strength paper comprising paper and a crosslinked polyurethane which is the reaction product of (i) bis(2-isocyanato)ethyl fumarate and (ii) a diol selected from the group consisting of (a) an alkanediol having from 2 to 12 carbon atoms and (b) a polyalkylene glycol having from 2 to 5 carbon atoms in the alkylene moiety thereof and a molecular weight from 106 to 8000.

3. A wet strength paper comprising paper and a crosslinked polyurethane which is the reaction product of (i) bis(2-isocyanato)ethyl fumarate and (ii) a diol selected from the group consisting of (a) an alkanediol having from 2 to 12 carbon atoms and (b) a polyalkylene glycol having from 2 to 5 carbon atoms in the alkylene moiety thereof and a molecular weight up to about 1000.

4. A wet strength paper comprising paper and a crosslinked polyurethane which is the reaction product of (i) bis(2-isocyanato)ethyl fumarate, (ii) a diol selected from the group consisting of (a) an alkanediol having from 2 to 12 carbon atoms and (b) a polyalkylene glycol having from 2 to 5 carbon atoms in the alkylene moiety thereof and a molecular weight from 106 to 8000 and (iii) a polymerizable 1,2-ethylenically unsaturated monomer.

5. A treated fabric comprising a fabric and a crosslinked polyurethane which is the reaction product of (i) bis(2-isocyanato)ethyl fumarate and (ii) a diol selected from the group consisting of (a) an alkanediol having from 2 to 12 carbon atoms and (b) a polyalkylene glycol having from 2 to 5 carbon atoms in the alkylene moiety thereof and a molecular weight from 106 to 8000.

6. A treated fabric comprising a fabric and a crosslinkable polyurethane which is the reaction product of (i) bis(2-isocyanato)ethyl fumarate and (ii) a diol selected from the group consisting of (a) an alkanediol having from 2 to 12 carbon atoms and (b) a polyalkylene glycol having from 2 to 5 carbon atoms in the alkylene moiety thereof and a molecular weight from 106 to 8000.

7. A treated fabric comprising a fabric and a crosslinked polyurethane which is the reaction product of (i) bis(2-isocyanato)ethyl fumarate and and (ii) a diol selected from the group consisting of (a) an alkanediol having from 2 to 12 carbon atoms and (b) a polyalkylene having from 2 to 5 carbon atoms in the alkylene moiety thereof and a molecular weight up to about 1000.

8. A treated fabric comprising a fabric and a crosslinked polyurethane which is the reaction product of (i) bis(2-isocyanato)ethyl fumarate, (ii) a diol selected from the group consisting of (a) an alkanediol having from 2 to 12 carbon atoms and (b) a polyalkylene glycol having from 2 to 5 carbon atoms in the alkylene moiety thereof and a molecular weight from 106 to 8000 and (iii) a polymerizable 1,2-ethylenically unsaturated monomer.

References Cited

UNITED STATES PATENTS

| | | | |
|---|---|---|---|
| 2,993,813 | 7/1961 | Tischbein | 117—138.8 X |
| 3,238,010 | 3/1966 | Habib et al. | 117—155 X |
| 3,256,220 | 6/1966 | Brotherton et al. | 260—18 X |
| 3,264,134 | 8/1966 | Vill et al. | 117—138.8 X |
| 3,275,679 | 9/1966 | Brotherton et al. | 260—77.5 X |
| 3,281,378 | 10/1966 | Garber et al. | 260—77.5 X |
| 3,311,527 | 3/1967 | Urbanic et al. | 117—161 X |
| 3,345,388 | 10/1967 | Milligan et al. | 260—18 X |
| 3,346,445 | 10/1967 | Gay | 162—164 X |

WILLIAM D. MARTIN, *Primary Examiner.*

M. LUSIGNAN, *Assistant Examiner.*